(12) United States Patent
Yaskin

(10) Patent No.: US 8,700,508 B2
(45) Date of Patent: Apr. 15, 2014

(54) SYSTEMS AND METHODS FOR PROVIDING SPENDING INFORMATION AND BUDGETING RECOMMENDATIONS TO STUDENTS

(75) Inventor: David Yaskin, Arlington, VA (US)

(73) Assignee: Blackboard, Inc., Washington, DC (US)

( * ) Notice: Subject to any disclaimer, the term of this patent is extended or adjusted under 35 U.S.C. 154(b) by 696 days.

(21) Appl. No.: 12/151,592

(22) Filed: May 6, 2008

(65) Prior Publication Data

US 2009/0281873 A1 Nov. 12, 2009

(51) Int. Cl.
*G06Q 40/00* (2012.01)
*G06Q 40/06* (2012.01)

(52) U.S. Cl.
CPC ............... *G06Q 40/00* (2013.01); *G06Q 40/06* (2013.01)
USPC .............................................. 705/35; 705/38

(58) Field of Classification Search
CPC ................................ G06Q 40/00; G06Q 40/06
USPC ....................................................... 705/35, 38
See application file for complete search history.

(56) References Cited

U.S. PATENT DOCUMENTS

| | | | | |
|---|---|---|---|---|
| 6,021,943 | A * | 2/2000 | Chastain | 235/379 |
| 6,334,127 | B1 * | 12/2001 | Bieganski et al. | 1/1 |
| 2003/0028466 | A1 | 2/2003 | Jenson et al. | |
| 2004/0193541 | A1 | 9/2004 | Lasater et al. | |
| 2005/0097017 | A1 * | 5/2005 | Hanratty | 705/35 |
| 2006/0031123 | A1 | 2/2006 | Leggett et al. | |
| 2006/0074788 | A1 * | 4/2006 | Grizack et al. | 705/35 |

OTHER PUBLICATIONS

International Search Report/Written Opinion PCT/US2009/043002, mailed Jun. 19, 2009.

* cited by examiner

*Primary Examiner* — Daniel Felten
(74) *Attorney, Agent, or Firm* — McDermott Will & Emery LLP

(57) ABSTRACT

Systems and methods are provided for electronically providing spending information and budgeting recommendations to a student of an educational institution. The systems and methods comprise capturing student interaction data, wherein the student interaction data has one or more data elements. At least one of the captured one or more data elements is associated with student financial account usage. The systems and methods provide spending data based on the student financial account usage, and provide one or more spending recommendations based at least in part on the associated student financial account usage. The spending recommendations may be based at least in part on a student role (e.g., first year student, second year student, a transfer student, a non-traditional student, or a foreign student, etc.), demographic, activities attended, or academic major.

28 Claims, 7 Drawing Sheets

SYSTEMS AND METHODS FOR PROVIDING SPENDING INFORMATION AND BUDGETING RECOMMENDATIONS TO STUDENTS

FIELD

The present disclosure generally relates to computer software and hardware systems, and, in particular, relates to systems and methods for providing spending information and budgeting recommendations to students.

BACKGROUND

Students entering educational institutions, such as colleges or universities, typically have little or no experience handling money and can find the prospect of sticking to a budget daunting. It is probably the first time a student has lived on his or her own without a parent or guardian monitoring every activity. As exciting as the prospect of attending an educational institution such as a college or university is, this much freedom and opportunity can make budgeting particularly difficult. Having a budget under control means that a student needs to examine how money is spent. Not knowing exactly where money is going or where it will be spent is not an uncommon phenomenon, especially when automatic teller machines (ATMs) and credit cards can feel like free money to a student.

Accordingly, there exists a need for systems and methods for providing spending information and budgeting recommendations to a student of an educational institution.

SUMMARY

Systems and methods of the disclosure relate to providing spending information and budgeting recommendations to students based upon financial account usage associated with a student's personal identification card, electronic device configured with account data, and/or universal account. The financial account may be a portion of the student's universal account, wherein the universal account may also provide, e.g., access control to student services. The system may enable the student to access information related to the total amount of money associated with the account, the amount of money initially associated with the account, where money has been spent and on what items within a particular period of time, or any other suitable data. Recommendations may also be provided as to how the remaining account balance may be allocated towards purchases for a time interval (e.g., a semester, the remaining portion of a semester, for the rest of the academic year, etc.). The systems and methods may be preferably utilized, for example, for incoming freshman students, transfer students, non-traditional students, and part-time students. Spending recommendations may be based at least in part on student roles (e.g., first year student, second year student, transfer student, non-traditional student, foreign student, etc.). For example, if the student is a science or engineering major, additional expenses may be associated with particular science and engineering majors (e.g., laboratory fees, computer software costs, etc.). Additionally, if a student is a part-time or full-time student living off-campus, the recommendations may be directed towards budgeting for meals, utilities, rental housing, etc. Accordingly, spending recommendations may be associated with a particular demographic, activities attended, or student roles. Financial recommendations systems and methods may be seeded based on actual data collected for a predefined period, from survey results, or from estimates, any combination thereof, or any other suitable information.

Systems and methods are provided for electronically providing spending information and budgeting recommendations to a student of an educational institution. The systems and methods comprise capturing student interaction data, wherein the student interaction data has one or more data elements. At least one of the captured data elements may be associated with student financial account usage. The systems and methods provide spending data based on the student financial account usage, and provide one or more spending recommendations based at least in part on the associated student financial account usage.

The systems and methods may further comprise reading a swiped card configured with student financial account data, reading a card configured with student financial account data with a proximity reader, retrieving student financial account data stored on an electronic device via a wired or wireless communication interchange, or recording an electronic transaction using student financial account data from a computer event, or any combination thereof.

The systems and methods may provide the spending recommendations based at least in part on a student role, demographic, activities attended, or academic major, or any combination thereof. The student role comprises a first year student, a second year student, a transfer student, a non-traditional student, or a foreign student, or any combination thereof.

The systems and methods may provide spending recommendations based at least in part on data collected for a predefined period, from survey results, or from estimates, or any combination thereof.

The exemplary systems and methods may provide the total amount of money associated with the student account, the amount of money in the student account at a beginning of a particular time period, information related to where the money from the student account was spent, information related to on what goods the money from the student account was spent, or information related to on what services the money from the student account was spent, or any combination thereof.

The systems and methods may also apply factor analysis to the captured one or more student interaction data elements.

Systems and methods are provided for electronically providing spending information and budgeting recommendations to a student of an educational institution. One or more first student spending recommendations is provided based at least in part on a student role. The systems and methods capture student interaction data, wherein the student interaction data has one or more data elements. The data elements are associated with student financial account usage. The systems and methods compare the student financial account usage with the first student spending recommendations, and provide one or more second student spending recommendations based at least in part on the student role and the compared student financial account usage with the first student spending recommendations.

The disclosure also encompasses program products for providing spending information and budgeting recommendations to students based on the captured student interaction data of the type outlined above. In such a product, the programming is embodied in or carried on a machine-readable medium.

Additional features will be set forth in the description below, and in part will be apparent from the description, or may be learned by practice of the exemplary embodiments.

The exemplary embodiments will be realized and attained by the structure particularly pointed out in the written description and claims hereof as well as the appended drawings.

It is to be understood that both the foregoing general description and the following detailed description are exemplary and explanatory and are intended to provide further explanation of the claims.

BRIEF DESCRIPTION OF THE DRAWINGS

The accompanying drawings, which are included to provide further understanding of the exemplary embodiments and are incorporated in and constitute a part of this specification, illustrate embodiments and together with the description serve to explain the embodiments. In the drawings.

DETAILED DESCRIPTION

In the following detailed description, numerous specific details are set forth to provide a full understanding of the exemplary embodiments. It will be obvious, however, to one ordinarily skilled in the art that the embodiments may be practiced without some of these specific details. In other instances, well-known structures and techniques have not been shown in detail so as not to obscure the embodiments.

Figure 1:
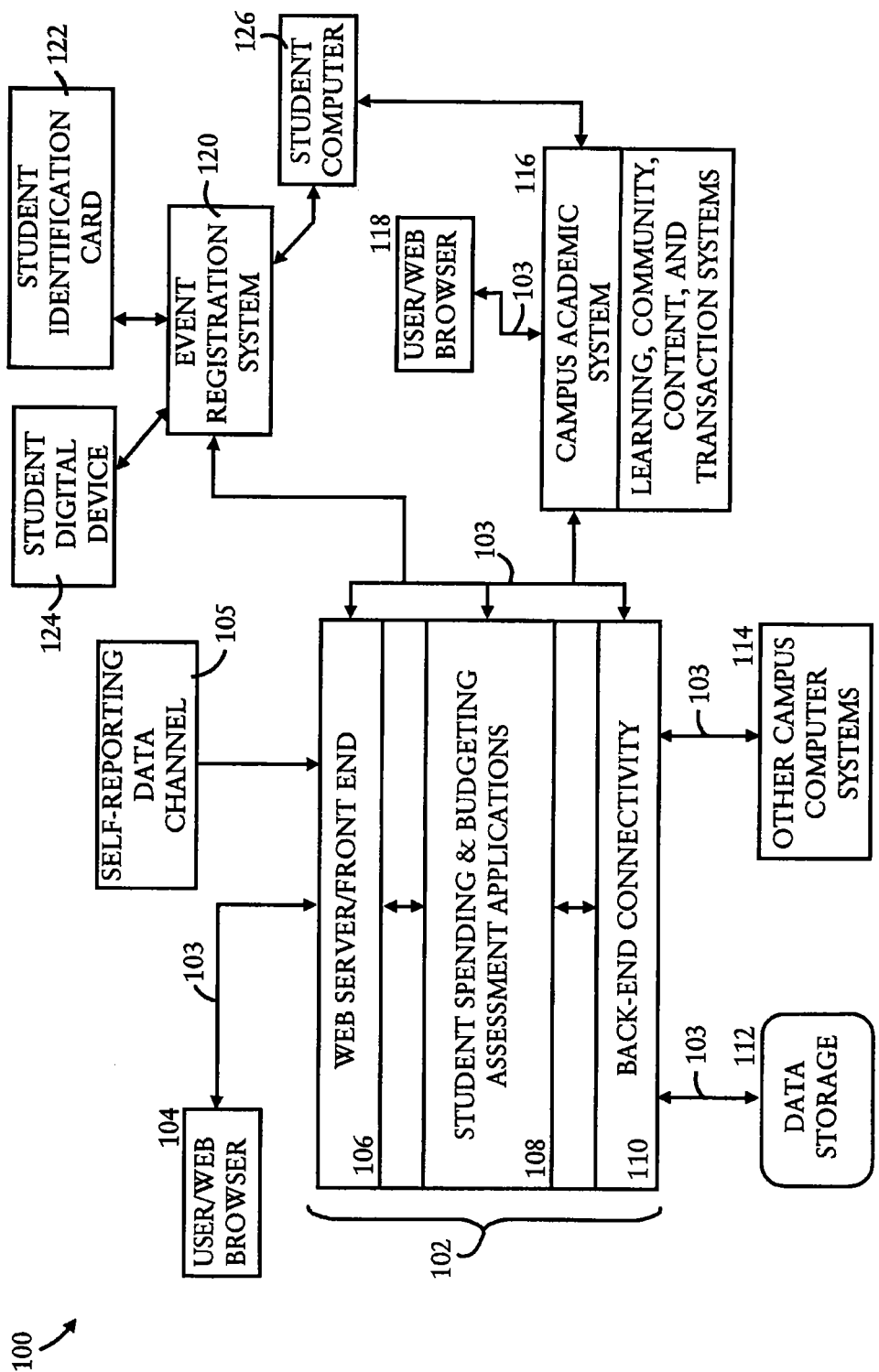
FIG. 1 illustrates an exemplary block-level diagram of an educational institutional environment in which a student spending information and budgeting recommendation system is implemented according to an exemplary embodiment.

FIG. 1 depicts a functional block diagram of an exemplary spending information and budgeting recommendation system 100. As described in more detail herein, system 100 may provide a framework for providing a student of an educational institution with budgeting recommendations as well as spending data based on purchases of goods and/or services made by a student using a student financial account. Computing system 102 may be one or more computers (e.g., one or more servers, personal computers, minicomputers, mainframe computers, or any other suitable computing devices, or any combination thereof) that may be configured with front-end 106, student spending and budgeting applications 108, and back-end connectivity 110.

User computer 104 may be configured to communicate with computer system 102 via a web browser or similar interface to communicate with an appropriately configured front-end 106 of system 102. Communication between user computer 104 and front end 106 of computer system 102 may be via communications link 103, which may be a wireless or wired communications link such as a local area network, wide area network, the Internet, or any other suitable communications network. Front-end 106 may be, for example, a web server or other computing device hosting one or more student spending and budgeting applications 108 that user computer 104 may access.

Applications 108 may be one or more software components or programs that execute on a programmable computer platform of computer system 102 to provide functionality related to providing student spending information and budgeting recommendations. Such applications 108 may include components for capturing student interaction data (e.g., student purchases of goods and/or services, use of campus facilities of the educational institution, etc.), providing recommended budgets (e.g., for one or more categories of expenditures, etc.), providing student spending information, and identifying areas for reduction in student spending. Applications 108 may provide recommended budgets for a particular time period, such as a weekly budget, monthly budget, semester budget, academic year budget, or budgets for any other suitable time period. Applications 108 may provide student average expenditures as compared to a budget for a particular student, or the expenditures of a particular student. In providing one or more budget recommendations, applications 108 may consider student housing (e.g., on-campus housing, off campus housing, etc.), meal plans (e.g., 14 meal plan, 21 meal plan, declining balance account, no meal plan with the dining services of the educational institution, etc.), initial and/or current amount in a student spending account, class year (e.g., first year student, second year student, freshman, sophomore, graduate student, etc.), academic major, or any other suitable information, or any combination thereof.

Computing system 102 may also access data storage facilities 112 and other computer systems 114 via communications link 103. For example, data storage facilities 112 may be one or more digital data storage devices configured with one or more databases having student data (e.g., student identification number, student name, student gender, student race, student expenditures, courses completed, course type (e.g., on-line courses, distance learning courses, on-campus courses, summer courses, continuing education courses, etc.), courses enrolled in, degree program, certificate program, etc.) and may also contain data received from a registration event with a student identification card, device configured with student information, and/or from registering an event by which a student entered identification data (e.g., a login event to a educational institution computer network application using student identification information). Data storage facilities 112 may store and arrange data in a convenient and appropriate manner for manipulation and retrieval. Other computer systems 114 may be a variety of third-party systems that contain data or resources that are useful for the data correlation system 100. In the exemplary higher education environment, systems 114 may include a student information system (SIS) that maintains student demographic information. Systems 114 may also include an electronically maintained class or course schedule for the institution that includes information about the courses such as section numbers, professors, class size, department, college, the students enrolled, etc. Other campus-related systems such as financial aid and the bursar's office may be included in systems 114 of FIG. 1.

Back-end connectivity 110 of computer system 102 may be appropriately configured software and hardware that interface between applications 108 and resources including, but not limited to, data storage 112 and other computer systems 114 via communications link 103.

Another resource to which the back end 110 may provide connectivity (e.g., via communications link 103) is a campus (or institutional) academic system 116. Campus academic system 116, in an academic environment, provides a platform that allows students and teachers to interact in a virtual environment based on the courses for which the student is enrolled. This system may be logically separated into different components such as a learning system, a content system, a community system, or a transaction system, or any other suitable system, or any combination thereof. For example, a student, administrator, faculty or staff member may operate user computer 118 to access academic system 116 via a web browser or similar interface.

Of particular usefulness to system 100, academic system 116 may provide a virtual space that user computer 118 may access to receive information and to provide information. One exemplary arrangement provides user computer 118 with a webpage where general information may be located and that has links to access course-specific pages where course-specific information is located. Electronic messaging, electronic drop boxes, and executable modules may be provided within the user's virtual space on the academic system 116. Thus, with respect to computer system 102, one of applications 108 may be used to generate information that is to be deployed to one or more users of academic system 116. Via back-end 110, the information may be sent to academic system 116 where it is made available to user computer 118 just as any other information may be made available. Similarly, from within the academic system 116, the user may enter and submit data that is routed through the back end 110 to one of the applications 108. Academic system 116 and computer system 102 may be more closely integrated so that the connectivity between the applications 108 and the system 116 is achieved without a network connection or back end software 110.

System 102 may be communicatively coupled to one or more registration systems 120, which may be a card reader, proximity reader, or other suitable system configured to capture information from student identification card 122, student digital device 124 (e.g., cellular phone, personal digital assistant, handheld computing device, laptop computer, etc.), or student computer 126. Although only one student identification card 122, student digital device 124, and computer 126 are shown, there may be one or more of each respective device that may communicate with registration system 120. Identification card 122, digital device 124, and/or computer 126 may be configured with student identification information (e.g., student name, student identification number, student spending account information, class schedule, major, dining services plan, dormitory, gender, race, nationality, etc.). For example, student identification card 122 may be swiped, scanned, or registered by proximity by registration system 120 at an event (e.g., purchasing event, cultural event, entertainment event, athletic event, etc.) to capture and associate any financial transactions associated with the attendance by the student at the particular event. In another example, student identification card 122 may be swiped, scanned, or registered by proximity by registration system 120 at a particular vendor or retailer (e.g., on-campus merchant, off-campus merchant, dining service facility, concert hall, athletic stadium, etc.). Alternatively, student digital device 124 may communicate student identification information via a wired or wireless communications link with registration system 120 at an event. Also, student computer 126 may communicate with registration system 120 to provide student information and student spending account information with an on-line purchasing event (e.g., purchasing goods and/or services via an on-line retailer). Data captured by registration system 120 may be transmitted to computer system 102 via communications link 103 for processing (e.g., by applications 108, etc.) and/or storage (e.g., stored in data storage 112, etc.).

Data may be captured from student identification card 122 or student digital device 124 related to presence, utilizations, and transactions by a student. For example, a student may use card 122 or device 124 to purchase a ticket for a concert for the city symphony or a ticket for an exhibit at the city art museum. Card 122 or device 124 may be enabled with banking account, declining balance account, or credit card account information, or other financial transaction enabling information to facilitate the purchase of the tickets. Additionally, attendance of the symphonic concert or art museum exhibit by the student may be registered by registration system 120, which may be present at the city symphonic hall where the concert is being performed or at the art museum in order to receive student identification data and event information data (e.g., concert information, location of symphony hall, time of attendance, etc.) from the swiping or registering of student identification card 122 or device 124.

In another example, a student may use card 122 or device 124 to purchase a bus ticket or bus pass from the city's transportation authority. Again, card 122 or device 124 may also be enabled with banking account, declining balance account, or credit card account information, or other financial transaction enabling information to facilitate the purchase of the bus ticket (e.g., single ride, round-trip, etc.) or bus pass (e.g., 2 ride pass, 4 ride pass, weekly pass, weekend pass, monthly pass, academic year pass, year pass, etc.). Alternatively, a student may purchase a bus pass or ticket with card 122 or device 124, and information related to the pass or ticket may be associated with card 122 or device 124. Upon using the bus with card 122 or device 124 having associated bus pass or ticket information, the bus may be equipped with at least a portion of registration system 120 to register student use of the bus (e.g., identification information of the student, bus route information, time used, etc.) and may deduct from the bus use allowance of the purchased bus ticket or pass (e.g., deduct a day of use from the weekly pass purchased from the student's account, etc.).

In yet another example, a student may use card 122 or device 124 to purchase a pizza from an off-campus merchant, or purchase a Calculus study guide from the on-campus bookstore. During the purchasing transaction, card 122 may be swiped or read by a proximity reader (e.g., event registration system 120), and data may be captured such as the identity of the student, the location of the purchase (e.g., name and location of off-campus vendor), and data related to the items that were purchased (e.g., large pepperoni pizza; title, author, and publisher of the Calculus study guide purchased; cost of the items, etc.). Card 122 or device 124 may also be enabled with banking account, declining balance account, or credit card account information, or other financial transaction enabling information to facilitate the purchase of the items. In another example, student computer 126 may be used in an on-line purchasing transaction with an on-line merchant, wherein the student identification, identification information related to the items purchased, and information related to the on-line vendor may be captured by event registration system 120 (e.g., student computer 126 may transmit the information to event registration system 120 after the transaction).

Although front end 106, applications 108, and back end 110 of the computer system 102 are each depicted as a single block in FIG. 1, one of ordinary skill will appreciate that each may also be implemented using a number of discrete, interconnected components. As for the communication links between the various blocks of FIG. 1, a variety of functionally equivalent arrangements may be utilized. For example, some links may be via the Internet or other wide-area network, while other links may be via a local-area network or even a wireless interface. Also, although only a single computer 104 of computer system 102 is explicitly shown, multiple users and multiple computers or computing devices may be utilized in system 100. The structure of FIG. 1 is logical in nature and does not necessarily reflect the physical structure of such a system. For example, computer system 102 may be distributed across multiple computer platforms as can the data storage 112. Furthermore, components 106, 108, 110 are separate in the figure to simplify explanation of their respective operation. However, these functions may be performed by a number of different, individual components, or a more monolithically arranged component. Additionally, any of the three logical components 106, 108, 110 may directly communicate with the academic system 116 without an intermediary. Also, although the users 104, 118 are depicted as separate entities in FIG. 1, they may, in fact, be the same user or a single web browser instance concurrently accessing both computer system 102 and the academic system 116.

Correlating student interaction data with purchases and predefined budget categories is a complex undertaking that encompasses many different levels of data collection and analysis. System 100 may be used to capture student interaction data from one or more sources from student purchases using a student spending account, provide information related to student expenditures, provide recommended budgets for one or more predefined budget categories, or provide areas to reduce student spending, or any other suitable information.

Figure 2:
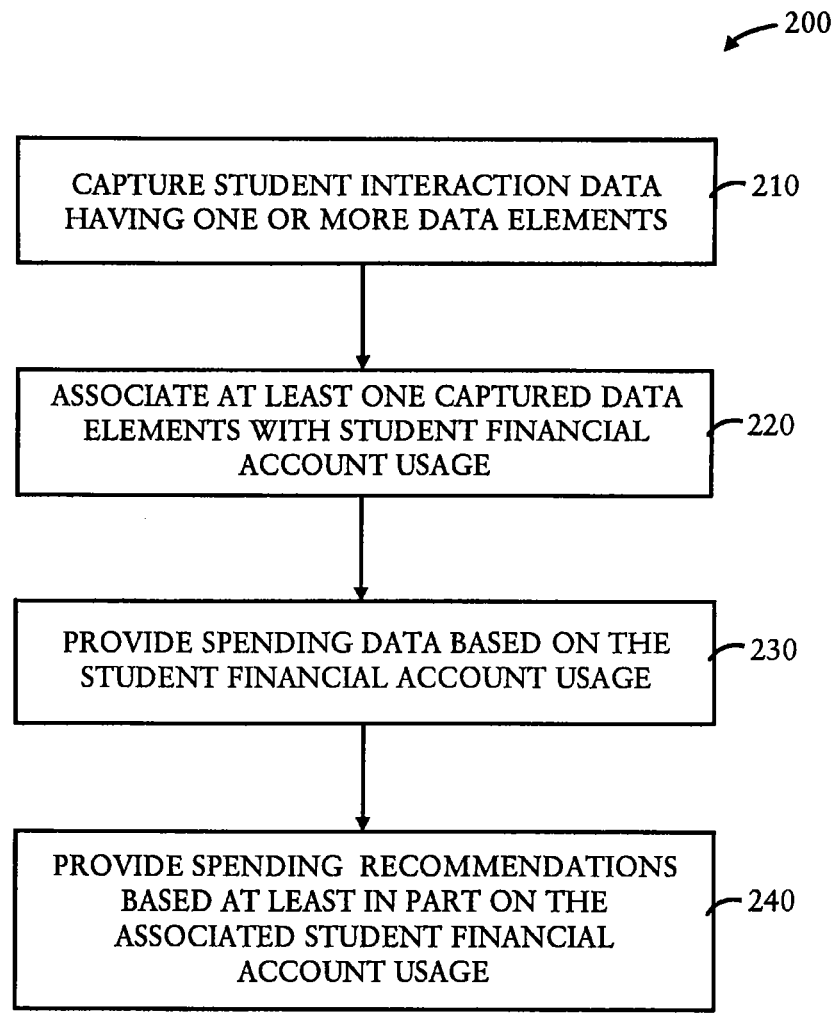
FIG. 2 is a flow diagram for providing spending information and budgeting recommendations to a student of an educational institution according to an exemplary embodiment.

FIG. 2 depicts an exemplary diagram for flow 200 for providing spending information and budgeting recommendations to a student of an educational institution. Computer system 102 (FIG. 1) configured with applications 108 may, for example, perform flow 200. At block 210, at least some student interaction data may be captured, where the captured data has one or more elements.

For example, system 100 may capture data (e.g., using registration system 120) related to student interaction data. The captured student interaction data may relate to, for example, when and where a student has attended class, visited the library, used dining services, entered and exited a dormitory, utilized an athletic facility, utilized entertainment offerings on- or off-site from an educational campus, participated in educational online organizations, attended educational events or lectures outside of class, patronage of on-campus merchants, patronage of off-campus merchants, patronage of on-line merchants, electronic submission of an assignment or other document, or electronic submission of personal identification information, utilization of an on-campus resource, utilization of an off-campus resource, or any transactional or utilization information, or any combination thereof.

As computer system 102 is to provide spending information (e.g., in display 500 of FIG. 5, etc.), captured data related to student expenditures with on-campus and/or off-campus merchants has increased importance. For example, the student may purchase gasoline for an automobile used for transportation using the student account associated with student identification card 122. Event registration system 120 may capture the identity of the student and information related to the purchase of gasoline, including the name and address of the gasoline merchant, the date and time of purchase, the amount charged per gallon or liter by the merchant, the number of gallons or liters of gasoline purchased by the student, the total amount of purchase, or any other suitable information.

At block 220, system 100 may associate at least one of the captured data elements with student financial account use. For example, computer system 102 of system 100 may determine which captured data elements relate to a purchasing of goods or services by a student from an on-campus or off-campus vendor, and may associate the data with student financial account usage. In the gasoline purchase example described above, the data captured related to the gasoline purchase by event registration system 120 may be associated with a predefined budget category of transportation. The amount purchased may be associated with the amount budgeted for transportation.

In another example, computer system 102 may correlate at least some of the captured student interaction data by applying factor analysis, as described in further detail below, to determine which captured data elements have an increased correlation with predefined budgeting categories. The budgeting categories may include, but are not limited to books and supplies, laboratory fees, on-campus entertainment, off-campus entertainment, transportation, health insurance, personal expenses, athletic fees, computer fees, telephone or cellphone expenses, or any other suitable budget categories (e.g., off-campus housing, groceries, utilities, clothing, etc.), or any combination thereof. In another example, computer system 102 may use factor analysis to determine which categories a student should reduce spending based on predefined budgeted amounts for each of these categories, and the amount of money remaining in the student account.

Figure 5:
FIG. 5 illustrates a display providing spending information for a particular student according to an exemplary embodiment.

At block 230, computer system 102 of system 100 may provide spending data based on the student financial account usage. For example, computer system 102 may provide amounts spent by a student for one or more predefined categories (e.g., books and supplies, laboratory fees, on-campus entertainment, off-campus entertainment, etc.). An exemplary spending display is illustrated in FIG. 5 and described below.

Figure 7:
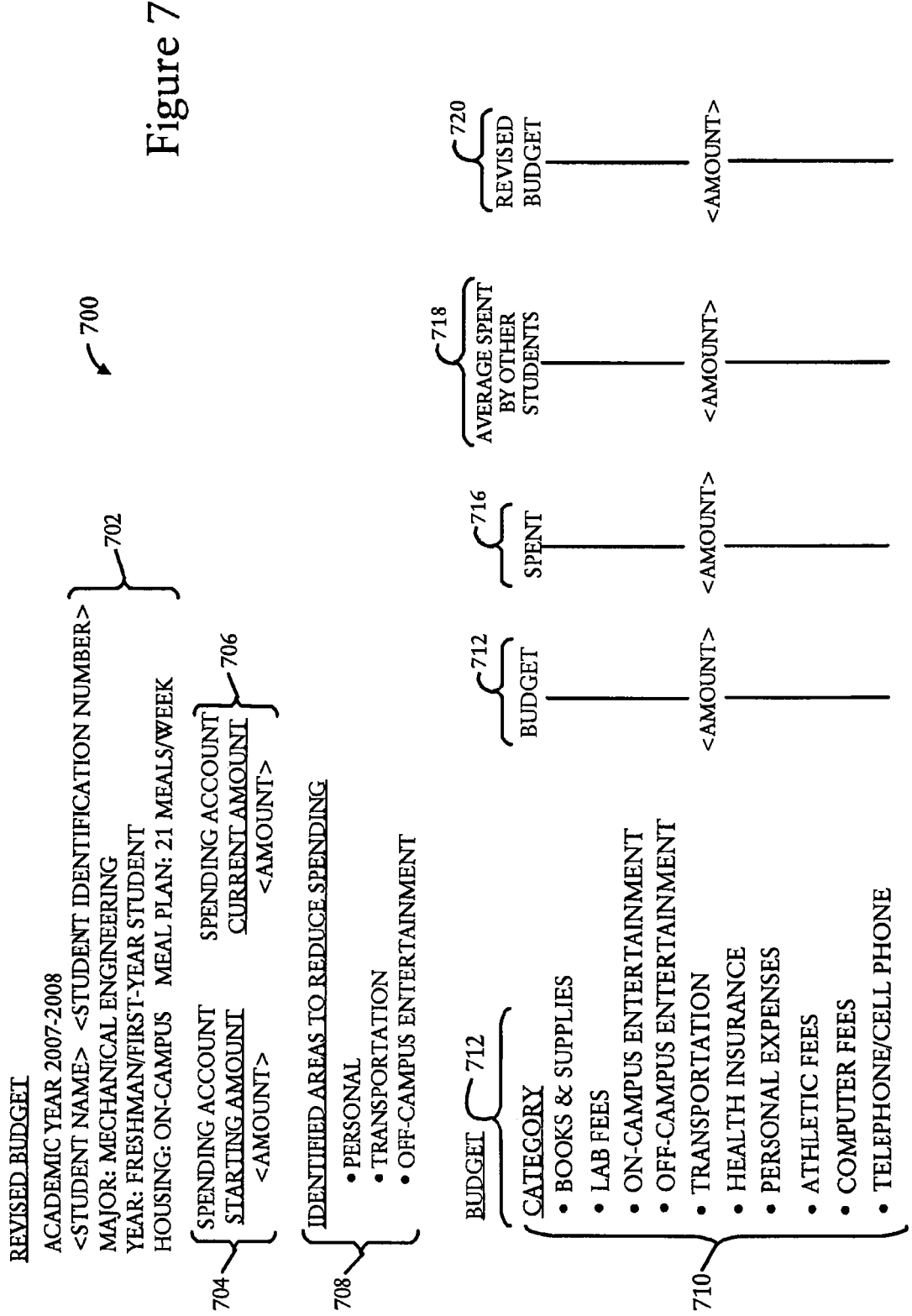
FIG. 7 illustrates a revised budget recommendation for a particular student based on the student's spending according to an exemplary embodiment.

At block 240, computer system 102 may provide spending recommendations based at least in part of the associated student financial account usage. The spending recommendations may be based on a particular student's financial account usage, or may be based on an average of student's account usage. Exemplary budgeting recommendation displays may be provided by computer system 102 to a student. Such exemplary displays may include display 400 of FIG. 4 and display 700 of FIG. 7. These exemplary displays are described below.

Factor analysis may be used by the exemplary systems described herein (e.g., system 100 of FIG. 1) as a statistical data reduction technique that may be used to explain variability among observed random variables in terms of fewer unobserved random variables (i.e., factors). The observed variables may be modeled as linear combinations of the factors. An advantage of factor analysis is the reduction of the number of variables by combining two or more variables into a single factor. Accordingly, factor analysis may be used for data reduction. For example, specific factors may be combined into a general, overarching factor such as academic performance. Another advantage of factor analysis is the identification of groups of inter-related variables to determine how they are related to each other. Thus, factor analysis may also be used as a structure detection technique. For example, purchasing of concert ticket may be correlated with a predefined budget category of off-campus entertainment, or purchasing of textbooks for a class at the on-campus bookstore may be associated with a books and supplies budget category.

Correspondence analysis also may be performed by the exemplary systems as described herein. Correspondence analysis may be used, for example, to analyze two-way and multi-way tables containing one or more measures of correspondence between data (i.e., data in the rows and columns of the table). The results may provide information which is similar in nature to those produced by factor analysis techniques. The structure of categorical variables included in the table may be identified and summarized for presentation to a user (e.g., administrator, faculty member, etc.).

In using factor analysis as a variable reduction technique, the correlation between two or more variables may be summarized by combining two variables into a single factor. For example, two variables may be plotted in a scatterplot. A regression line may be fitted (e.g., by computer system 102 of FIG. 1) that represents a summary of the linear relationships between the two variables. For example, if there are two variables, a two-dimensional plot may be performed, where the two variables define a plane. With three variables, a three-dimensional scatterplot may be determined, and a plane could be fitted through the data. With more than three variables it becomes difficult to illustrate the points in a scatterplot, but the analysis may be performed by computer system 102 to determine the regression summary of the relationships between the three or more variables. A variable may be defined that approximates the regression line in such a plot to capture the principal components of the two or more items. Data scores from student data on the new factor (i.e., represented by the regression line) may be used in future data analyses to represent that essence of the two or more items. Accordingly, two or more variables may be reduced to one factor, wherein the factor is a linear combination of the two or more variables.

The extraction of principal components may be found by determining a variance maximizing rotation of the original variable space. For example, in a scatterplot, the regression line may be the original X-axis, rotated so that it approximates the regression line. This type of rotation is called variance maximizing because the criterion for (i.e., goal of) the rotation is to maximize the variance (i.e., variability) of the "new" variable (factor), while minimizing the variance around the new variable. Although it is difficult to perform a scatterplot with three or more variables, the logic of rotating the axes so as to maximize the variance of the new factor remains the same.

After a line has been determined on which the variance is maximal, some variability remains around this first line. Upon extraction of the first factor (i.e., after the first line has been drawn through the data), another line may be defined that maximizes the remaining variability. In this manner, consecutive factors may be extracted. Because each consecutive factor is defined to maximize the variability that is not captured by the preceding factor, consecutive factors are independent of each other. Thus, consecutive factors are uncorrelated or orthogonal to each other.

In applying principal component analysis as a data reduction method (i.e., a method for reducing the number of variables), the number of factors desired to be extracted may be selected. As consecutive factors are extracted, the factors may account for decreasing variability. One method to determine when to stop extracting factors may depend on when the "random" variability has significantly decreased (i.e., very little random variability left). A correlation matrix may be used to determine the variance amongst each of the variables. The total variance in that matrix may be equal to the number of variables.

In contrast to the variable reduction methods of principal component analysis described above, principal factor analysis may also be performed by computer system 102 of FIG. 1 to determine the structure in the relationships between variables. The student interaction data may be used to form a "model" for principal factor analysis. For example, the student interaction data may be dependent on at least two components. First, there may be one or more underlying common factors. Each item may measure some part of this common aspect. Second, each item may also capture a unique aspect (of the common aspect) that may not be addressed by any other item.

If this model is correct, the factors may not extract substantially all variance from the items. Rather, only that proportion that is due to the common factors and shared by several items may be extracted. The proportion of variance of a particular item that is due to common factors (shared with other items) is called communality. The communalities for each variable may be estimated (i.e., the proportion of variance that each item has in common with other items). The proportion of variance that is unique to each item may then the respective item's total variance minus the communality. A common starting point is to use the squared multiple correlation of an item with all other items as an estimate of the communality. Alternatively, various iterative post-solution improvements may be made to the initial multiple regression communality estimate.

A characteristic that distinguishes between the two factor analytic models described above is that in principal components analysis (i.e., factor reduction) may assume that substantially all variability in an item should be used in the analysis, while principal factors analysis (i.e., structure detection) may use the variability in an item that it has in common with the other items. In most cases, these two methods usually yield very similar results. However, principal components analysis is often preferred as a method for data reduction, while principal factors analysis is often preferred when the goal of the analysis is to detect structure.

Computer system 102 of FIG. 1 configured with factor analysis applications programming (e.g., as part of applications 108) may provide budgeting recommendations to a student, correlate student purchases with predefined budget categories, identify categories to reduce spending based on budgeted amount and related student expenditures, or apply factor analysis in any other suitable manner, or any combination thereof. System 102 may use quantitative techniques, such as data gathering from registration system 120 (e.g., swipes of student identification card 122, proximity readings of card 122, registration of digital device 124 configured with personal information, capturing transaction information (e.g., on-line purchases) from computer 126), to collect data about a student concerning a student's use of a spending account. The captured data (taken alone or in combination with other data that may be stored, e.g., with data storage 112) may be used as input for a statistical application (e.g., applications 108) of computer system 102 of FIG. 1, which may process the data using factor analysis. System 102 may yield a set of underlying attributes (i.e., factors). Upon determination of the factors, system 102 may construct perceptual maps, graphs, or other textual or visual output to indicate: recommended student budgets based on one or more categories; student expenditures for each budget category; average student spending (e.g., for similarly situated students in a similar class year, major, account balance, etc.); identify budget categories for a student to reduce spending based on previously budgeted amounts, student account amounts, and present levels of spending; and revised recommended budgets based at least in part on the amount remaining in the student account. System 102 may present such maps, graphs, text, and/or numbers in displays for presentation to a student to aid in assessing a budget and spending.

Computer system 102 may be configured with programming that is executed to perform factor analysis on one or more elements of data to isolate underlying factors that summarize the resultant information as it relates to providing budget recommendations and identifying categories for a student to reduce expenditures. The factor analysis may be an interdependence technique, wherein one or more sets of interdependent relationships may be examined. The factor analysis may reduce the rating data on different attributes to a few important dimensions (e.g., budget categories such as books and supplies, health insurance, transportation, etc.). This reduction is possible because the attributes are related (e.g., the purchasing of textbooks is related to expenditures from a student spending account, and further relates to a predefined budget category of books and supplies, etc.). The rating given to any one attribute is partially the result of the influence of other attributes. Thus, system 102 may determine which goods and services a student uses a student spending account to purchase, which predefined budget categories these expenditures relate to, and whether the present expenditures for one or more budget categories are above, below, or equal to previously budgeted amounts. System 102 may also provide recommendations as to areas or categories to reduce expenditures (e.g., as shown in exemplary display 700 of FIG. 7, spending reduction list 708 may include recommendations for reducing spending on transportation, personal expenses, and off-campus entertainment, etc.). The statistical programming (e.g., application 108) implemented on system 102 may deconstruct the rating (i.e., raw score) into one or more components, and reconstruct the partial scores into underlying factor scores. The amount of correlation between the initial raw score and the final factor score is referred to as factor loading.

Figure 3:
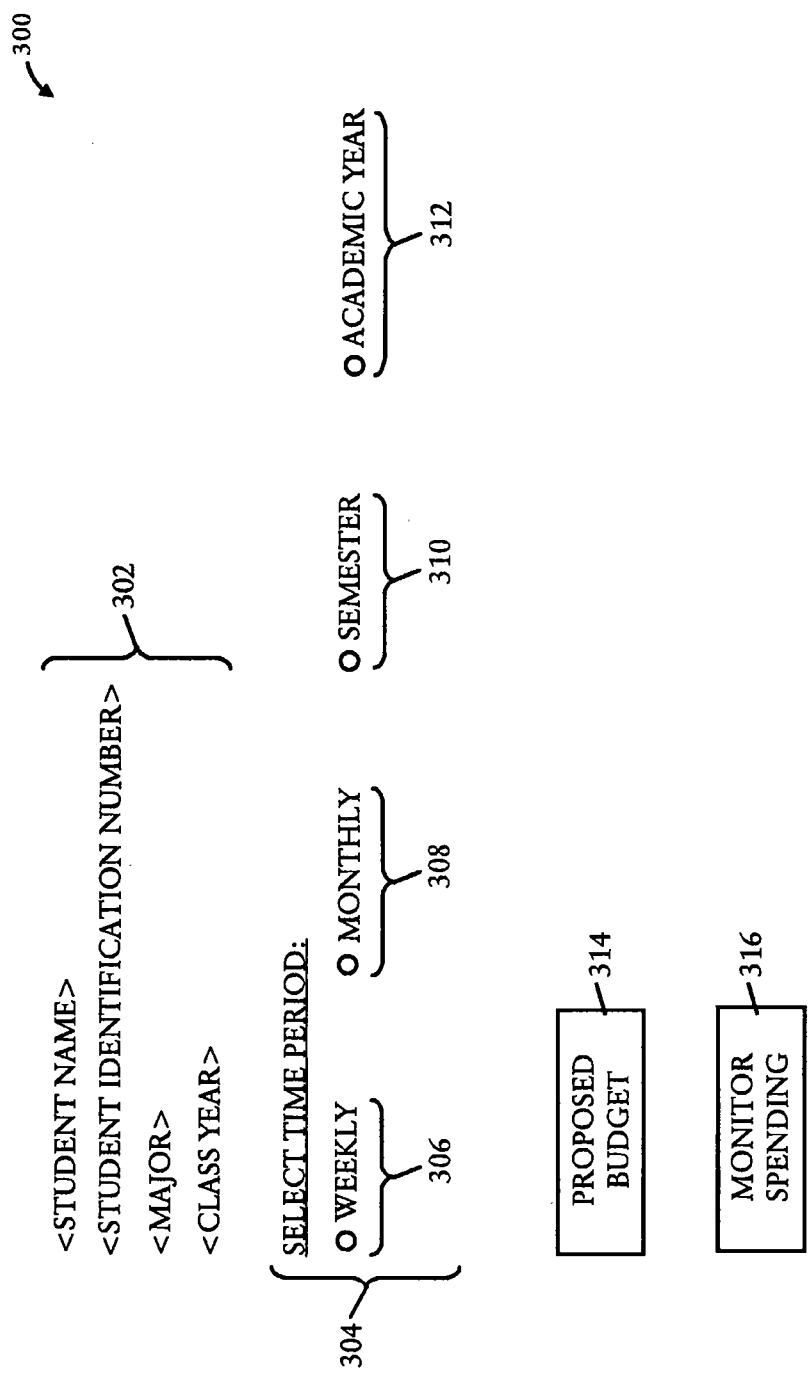
FIG. 3 illustrates a display for selecting budgeting recommendations or spending information for a particular student according to an exemplary embodiment.

FIG. 3 illustrates display 300 for selecting budgeting recommendations or spending information for a particular student according to an exemplary embodiment. Display 300 may include student information 310, which indicates the student name, a student identification number with the educational institution, the academic major of the student (e.g., mechanical engineering, etc.), the student year (e.g., freshman, sophomore, junior, senior, first year student, second year student, etc.), any other suitable information, or any combination thereof. A user (e.g., using computer 104 of FIG. 1) may select from the time period options in area 304. The time period selections may include, but are not limited to weekly time period 306, monthly time period 308, semester time period 310, academic year time period 312, or any other suitable time period (e.g., trimester, quarter, bi-weekly, etc.). After selection of a time period, a user may select "proposed budget" button 314 or "monitor spending" button 316 for the selected time period.

Figure 4:
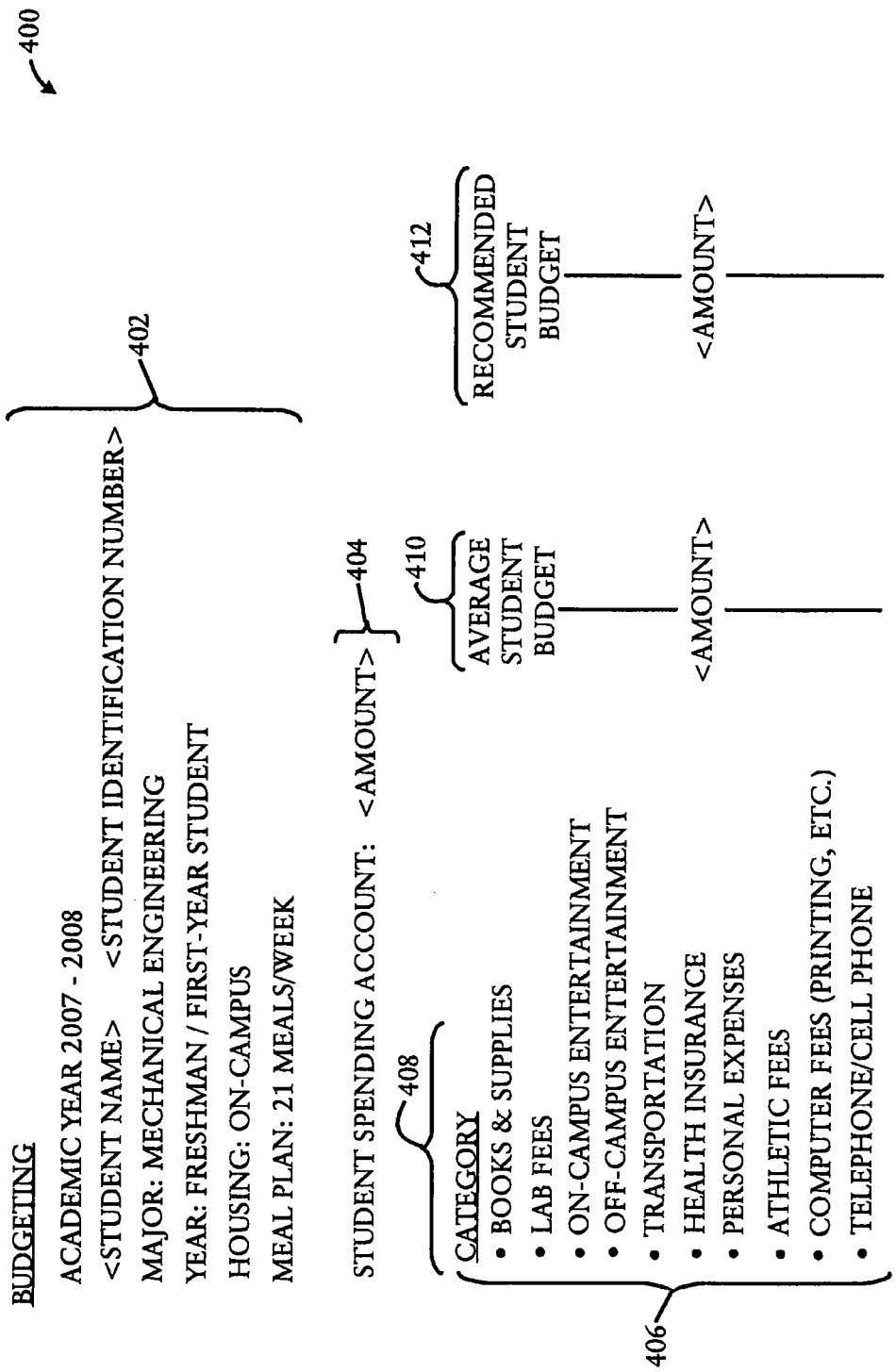
FIG. 4 illustrates a display providing budgeting recommendations for a particular student according to an exemplary embodiment.

Upon selection of "proposed budget" button 314, computer system 102 of FIG. 1 may present display 400 of FIG. 4 to a student or other person utilizing computer 104. Display 400 may indicate student information 402, which may include, but is not limited to the student name, the student identification number, the student's academic major (e.g., mechanical engineering, etc.), the student's class year (e.g., freshman, sophomore, first year student, second year student, etc.), the academic year (e.g., 2007-2008, 2008-2009, etc.), housing status (e.g., on-campus housing, off-campus housing, meal plan (e.g., 14 meals per week, 21 meals per week, declining balance amount, no meal plan, etc.), or any other suitable information, or any combination thereof.

Amount 404 of display 400 may indicate the total amount in a student spending account for a particular period of time (e.g., the academic year, semester, quarter, trimester, etc.).

As part of display 400, computer system 102 may provide budget 406, which may include budget categories 408, average student budget 410, recommended student budget 412. Budget categories 408 may indicate various categories of student spending. Such categories may include, but are not limited to books and supplies, laboratory fees, on-campus entertainment, off-campus entertainment, transportation, health insurance, personal expenses, athletic fees, computer fees, telephone or cellphone expenses, or any other suitable budget categories (e.g., off-campus housing rent, groceries, utilities, car payment, clothing, etc.), or any combination thereof. Average student budget 410 may provide historical average amounts spent by similarly situated students (e.g., in terms of major, class year, housing situation, meal plans, initial student spending account amount, etc.) for each category in budget categories 408. The data for each budget category item in average student budget 410 may be compiled at least in part from student surveys, data captured by event registration system 120 of FIG. 1, data stored in data storage 112 or other campus computer systems 114, self-reported student information, data from a third party provider, or from any other suitable data source, or any combination thereof. The student may self-report the student information using the student computer 126 (FIG. 1), or any other method of self-reporting to the system, such as surveys, etc. Hence, the self-reporting may be through the student computer 126, or through another channel 105 (schematically shown in FIG. 1) to the computer system 102.

Computer system 102 may also present recommended student budget 412, which may provide recommended budget amounts for each category of budget categories 408. Each category for recommended student budget 412 may be based on the student year, student major, initial amount in student spending account, average student budget 410, or any other suitable information, or any combination thereof.

Turning again to display 300 of FIG. 3, if a student or other person selects "monitor spending" button 316, computer system 102 may present display 500 illustrated in FIG. 5. Display 500 may include student information 502, which may include, but is not limited to the student name, the student identification number, the student's academic major (e.g., mechanical engineering, etc.), the student's class year (e.g., freshman, sophomore, first year student, second year student, etc.), the academic year (e.g., 2007-2008, 2008-2009, etc.), housing status (e.g., on-campus housing, off-campus housing, meal plan (e.g., 14 meals per week, 21 meals per week, declining balance, no meal plan, etc.), or any other suitable information, or any combination thereof.

Amount 504 of display 500 may indicate the total amount in a student spending account for a particular period of time (e.g., the academic year, semester, quarter, trimester, etc.). Amount 506 may indicate the amount remaining in a student spending account. Graph 508 may indicate a graphical display showing the amount of time elapsed in the academic year or any other suitable time period (e.g., semester, trimester, quarter, etc.). Graph 510 may indicate a graphical display that indicates the initial total amount of the student spending account, and how much money has been spent. Graph 510 may also indicate the amount that was budgeted to be spent (e.g., by the point in the academic year as illustrated in graph 508).

Budget categories 512 may indicate various categories of student spending. Such categories may include, but are not limited to: books and supplies, laboratory fees, on-campus entertainment, off-campus entertainment, transportation, health insurance, personal expenses, athletic fees, computer fees, telephone or cell phone expenses, or any other suitable budget categories (e.g., off-campus housing costs, groceries, utilities, car payment, clothing, etc.), or any combination thereof. Budgeted amount 514 may indicate the amount for each category of budget categories 512 previously budgeted (e.g., as illustrated by recommended student budget 412 of FIG. 4). Spent amount 516 may indicate the amount for each category of budget categories 512 that was spent by a student. The actual amounts for each category may be determined by computer system 102 from data captured from event registration system 120. For example, student spending account information may be utilized when student identification card 122 is swiped or read by a proximity reader during a purchasing transaction (e.g., purchase books at the on-campus bookstore, purchase a pizza from an off-campus merchant, etc.). Data related to the transaction may be provided to computer system 102 from event registration system 120, where computer system 102 may process the captured data using applications 108, and may store the data in data storage 112.

Figure 6:
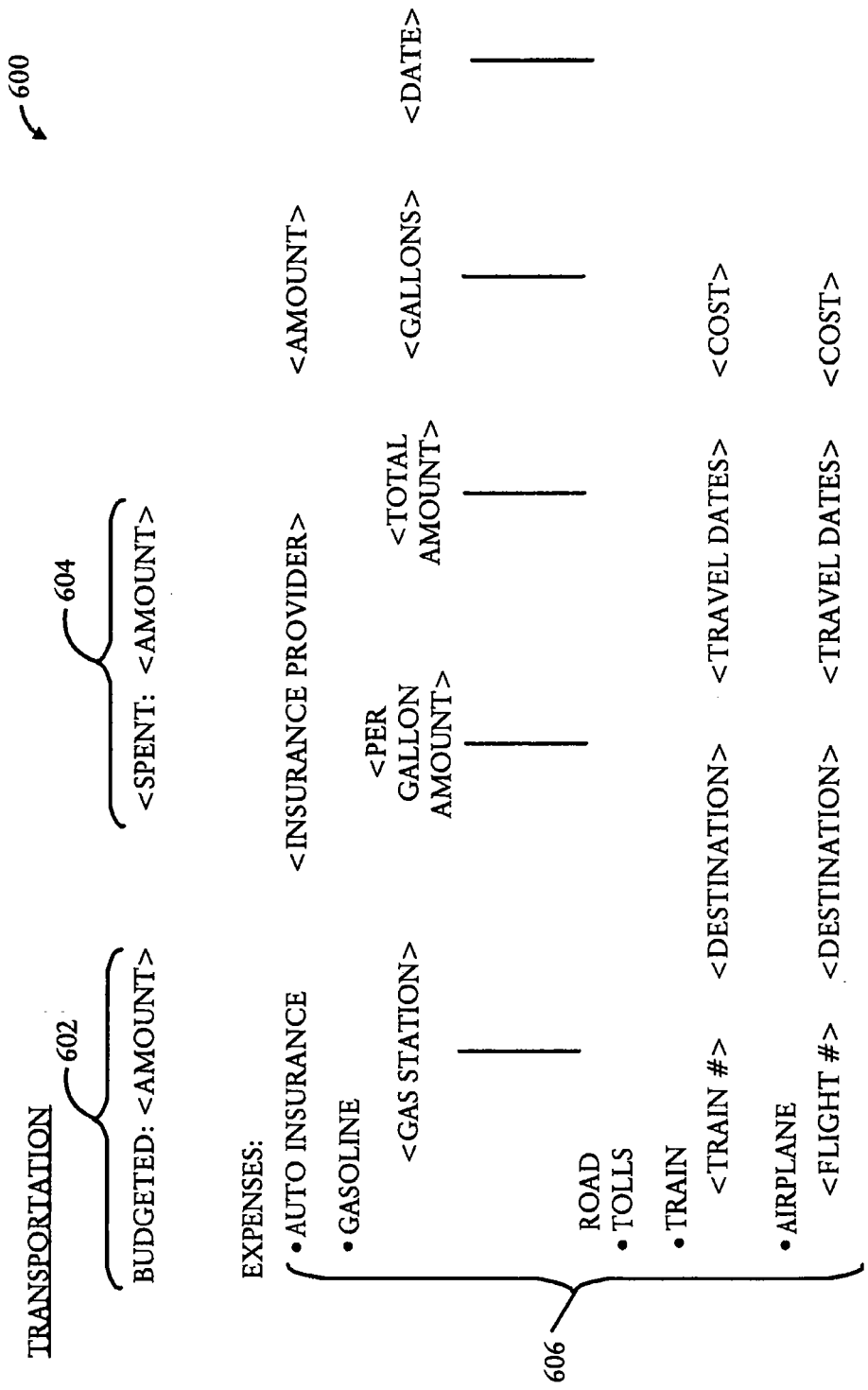
FIG. 6 illustrates a display indicating transportation spending for a particular student according to an exemplary embodiment.

A student or other person may select a particular category from budget categories 512 in order to display data captured related to the category. For example, a student may select transportation category 518. Upon selection of category 518, computer system 102 may present display 600 of FIG. 6. Display 600 may include transportation budget 602, which is the amount of transportation expenditures budgeted for (e.g., in recommended budget 412). Display 600 may also indicate transportation spending 604, which may be the amount spent by a student on transportation (e.g., as captured by event registration system 120 of FIG. 1). Transportation expenses list 606 may provide an itemize list of all transportation expenses incurred by the student. For example, transportation expenses list may include: automobile insurance information (e.g., including insurance provider, insurance premium amount, etc.); gas (e.g., gas station, price paid per gallon, total amount paid, total number of gallons purchased, date of purchase, etc.); toll road expenses; train or subway fare (e.g., service provider, date of purchase, travel dates); bus fare (e.g., service provider, date of purchase, ticket amount, date(s) of travel, etc.); airfare (including, e.g., service provider, flight number, destinations, date(s) of travel, etc.); or any other suitable information.

Turning again to display 500 of FIG. 5, graph 520 may graphically indicate the budgeted amount and spent amount for each category of budget categories 520.

A student or other user may select "revise budget" button 522 in order to revise the student's budget based on the spent amount 516 and current amount available in student account 506. Upon selection of "revise budget" button 522, computer system 102 may present display 700 of FIG. 7. Display 700 may present student information 702, which may include, but is not limited to: the student name, the student identification number, the student's academic major (e.g., mechanical engineering, etc.), the student's class year (e.g., freshman, sophomore, first year student, second year student, etc.), the academic year (e.g., 2007-2008, 2008-2009, etc.), housing status (e.g., on-campus housing, off-campus housing, meal plan (e.g., 14 meals per week, 21 meals per week, declining balance, no meal plan, etc.), or any other suitable information, or any combination thereof.

Display 700 may also indicate amount 704, which is the total amount in a student spending account for a particular period of time (e.g., the academic year, semester, quarter, trimester, etc.). Amount 706 may indicate the amount remaining in a student spending account.

Computer system 102, using application 108 that may utilize the factor analysis as described above, may identify one or more categories of spending that are recommended for reduction in spending. These one or more categories may be listed in spending reduction list 708. For example, computer system 102 may recommend that personal expenses, transportation expenses, and off-campus entertainment expenses be reduced based at least in part on average student spending in one or more of these categories, the amount of money presently available in the student spending account, and the amount of expenditures in each of these categories by the student to date.

Budget information 710 may indicate budget categories 712, previously budgeted amounts 714, amount spent 716, average student expenditures 718, and revised budget 720. Budget categories 712 may include categories such as books and supplies, laboratory fees, on-campus entertainment, off-campus entertainment, transportation, health insurance, personal expenses, athletic fees, computer fees, telephone or cell phone expenses, or any other suitable budget categories (e.g., off-campus housing costs, groceries, utilities, car payment, clothing, etc.), or any combination thereof. Previously budgeted amounts 714 may indicate the amount budgeted (e.g., the amount initially or previous budgeted for the week, month, semester, academic year, etc.) for example, in recommended student budget 412 of FIG. 4. Amount spent 716 may indicate the expenditures by the student for each category in budget categories 712. The amounts for each category may be determined by data captured from event registration system 120. Computer system 102 may associate the captured data with the one or more categories of budget categories 712.

Average student expenditures 718 may indicate average spending or other suitable spending characteristics of other students of the educational institution for one or more categories of budget categories 712. Average student expenditures 718 may be expenditures from similarly situated students as the student indicated in student information 702. For example, the students may be in the same major, academic year (e.g., freshman, sophomore, etc.), residence hall, have the same meal plan, or any other similarity, or any combination thereof. Revised budget 720 may be related to previously budgeted amounts 714, but the amounts recommended for each of the categories in budget categories 712 may be based on the amount of funds currently available in the student's account, as indicated by amount 706. Thus, computer system 102 may provide recommendations regarding spending for a particular time period (e.g., week, month, semester, academic year, etc.) based at least in part on the average spending of students (e.g., as indicated by average student budget 410 of FIG. 4), amount 706, spending reduction list 708, previously budgeted amounts 714, or amount spent 716, or any other suitable information, or any combination thereof.

The detailed description set forth above in connection with the appended drawings is intended as a description of various embodiments and is not intended to represent the only embodiments which may be practiced. The detailed description includes specific details for the purpose of providing a thorough understanding of the embodiments. However, it will be apparent to those skilled in the art that the embodiments may be practiced without these specific details. In some instances, well known structures and components are shown in block diagram form in order to avoid obscuring the concepts of the exemplary embodiments.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for electronically providing financial information to a student of an educational institution, comprising:
   receiving an indication of a purchase event for a student, the purchase event comprising a purchase of an item or a service by the student;
   capturing, for the purchase event, student interaction data for the purchased item or the purchased service, wherein the student interaction data has one or more data elements comprising an indication of a location of the purchased item or the purchased service by the student, utilization of a merchant selling the purchased item or the purchased service to the student, or transaction for the purchased item or the purchased service by the student;
   associating, by a computer, the purchase event with a category of student financial account usage based on the at least one of the captured one or more data elements of the purchase event comprising the indication of the location of the purchased item or the purchased service by the student, utilization of the merchant selling the purchased item or the purchased service to the student, or transaction for the purchased item or the purchased service by the student; and
   providing spending data for the purchase event to the student, the spending data categorized according to a respective category of the student financial account usage.

2. The method of claim 1, further comprising providing one or more spending recommendations based at least in part on the associated student financial account usage.

3. The method of claim 1, wherein the capturing student interaction data comprises reading a swiped card configured with student financial account data, reading a card configured with student financial account data with a proximity reader, retrieving student financial account data stored on an electronic device via a wired or wireless communication interchange, or recording an electronic transaction from a computer event using student financial account data, or any combination thereof.

4. The method of claim 1, wherein the category of the student financial account usage comprises one or more budget categories.

5. The method of claim 2, wherein the providing the one or more spending recommendations is based at least in part on a student role, demographic, activities attended, or academic major, or any combination thereof.

6. The method of claim 5, wherein the student role comprises a first year student, a second year student, a transfer student, a non-traditional student, or a foreign student, or any combination thereof.

7. The method of claim 2, wherein providing spending recommendations is based at least in part on data collected for a predefined period, from survey results, or from estimates, or any combination thereof.

8. The method of claim 1, further comprising providing a total amount of money associated with a student account, an amount of money in the student account at a beginning of a particular time period, information related to where the money from the student account was spent, information related to on what goods the money from the student account was spent, or information related to on what services the money from the student account was spent, or any combination thereof.

9. The method of claim 1, further comprising applying factor analysis to the captured one or more student interaction data elements.

10. A system for electronically providing financial information to a student of an educational institution, comprising:
    a programmable computer configured to:
      receive an indication of a purchase event for a student, the purchase event comprising a purchase of an item or a service by the student;
      capture, for the purchase event, student interaction data for the purchased item or the purchased service, wherein the student interaction data has one or more data elements comprising an indication of a location of the purchased item or the purchased service by the student, utilization of a merchant selling the purchased item or the purchased service to the student, or transaction for the purchased item or the purchased service by the student;
      associate the purchase event with a category of student financial account usage based on the at least one of the captured one or more data elements of the purchase event comprising the indication of the location of the purchased item or the purchased service by the student, utilization of a merchant selling the purchased item or the purchased service to the student, or transaction for the purchased item or the purchased service by the student; and
      provide spending data for the purchase event categorized according to a respective category of the student financial account usage.

11. The system of claim 10, wherein the programmable computer is further configured to provide one or more spending recommendations based at least in part on the associated student financial account usage.

12. The system of claim 10, wherein the capturing student interaction data comprises reading a swiped card configured with student financial account data, reading a card configured with student financial account data with a proximity reader, retrieving student financial account data stored on an electronic device via a wired or wireless communication interchange, or recording an electronic transaction from a computer event using student financial account data, or any combination thereof.

13. The system of claim 10, wherein the category of the student financial account usage comprises one or more budget categories.

14. The system of claim 11, wherein the programmable computer configured to provide the one or more spending recommendations is based at least in part on a student role, demographic, activities attended, or academic major, or any combination thereof.

15. The system of claim 14, wherein the student role comprises a first year student, a second year student, a transfer student, a non-traditional student, or a foreign student, or any combination thereof.

16. The system of claim 11, wherein the programmable computer configured to provide spending recommendations is based at least in part on data collected for a predefined period, from survey results, or from estimates, or any combination thereof.

17. The system of claim 10, wherein the programmable computer is further configured to provide the total amount of money associated with the student account, the amount of money in the student account at a beginning of a particular time period, information related to where the money from the student account was spent, information related to on what goods the money from the student account was spent, or information related to on what services the money from the student account was spent, or any combination thereof.

18. The system of claim 10, wherein the programmable computer is further configured to apply factor analysis to the captured one or more student interaction data elements.

19. Computer readable media containing programming instructions for spending information and budgeting recommendations to a student of an educational institution, that upon execution thereof, causes one or more processors to perform the steps of:
receiving an indication of a purchase event for a student, the purchase event comprising a purchase of an item or a service by the student;
capturing, for the purchase event, student interaction data for the purchased item or the purchased service, wherein the student interaction data has one or more data elements comprising an indication of a location of the purchased item or the purchased service by the student, utilization of a merchant selling the purchased item or the purchased service to the student, or transaction for the purchased item or the purchased service by the student;
associating the purchase event with a category of student financial account usage based on the at least one of the captured one or more data elements of the purchase event comprising the indication of the location of the purchased item or the purchased service by the student, utilization of a merchant selling the purchased item or the purchased service to the student, or transaction for the purchased item or the purchased service by the student; and
providing spending data for the purchase event categorized according to a respective category of the student financial account usage.

20. The computer readable media of claim 19, wherein the steps further comprise providing one or more spending recommendations based at least in part on the associated student financial account usage.

21. The computer readable media of claim 19, wherein the capturing student interaction data comprises reading a swiped card configured with student financial account data, reading a card configured with student financial account data with a proximity reader, retrieving student financial account data stored on an electronic device via a wired or wireless communication interchange, or recording an electronic transaction from a computer event using student financial account data, or any combination thereof.

22. The computer readable media of claim 19, wherein the category of the student financial account usage comprises one or more budget categories.

23. The computer readable media of claim 20, wherein the providing the one or more spending recommendations is based at least in part on a student role, demographic, activities attended, or academic major, or any combination thereof.

24. The computer readable media of claim 23, wherein the student role comprises a first year student, a second year student, a transfer student, a non-traditional student, or a foreign student, or any combination thereof.

25. The computer readable media of claim 20, wherein providing spending recommendations is based at least in part on data collected for a predefined period, from survey results, or from estimates, or any combination thereof.

26. The computer readable media of claim 19, further comprising providing the total amount of money associated with the student account, the amount of money in the student account at a beginning of a particular time period, information related to where the money from the student account was spent, information related to on what goods the money from the student account was spent, or information related to on what services the money from the student account was spent, or any combination thereof.

27. The computer readable media of claim 19, further comprising applying factor analysis to the captured one or more student interaction data elements.

28. A method for electronically providing spending information and budgeting recommendations to a student of an educational institution, comprising:
providing one or more first student spending recommendations for a student based at least in part on a student role;
receiving an indication of a purchase event for the student, the purchase event comprising a purchase of an item or a service by the student;
capturing, for the purchase event, student interaction data for the purchased item or the purchased service, wherein the student interaction data has one or more data elements comprising an indication of a location of the purchased item or the purchased service by the student, utilization of a merchant selling the purchased item or the purchased service to the student, or transaction for the purchased item or the purchased service by the student;
associating, by a computer, the purchase event with a category of the captured one or more data elements with student financial account usage based on the at least one of the captured one or more data elements of the purchase event comprising the indication of the location of the purchased item or the purchased service by the student, utilization of a merchant selling the purchased item or the purchased service to the student, or transaction for the purchased item or the purchased service by the student;
comparing the student financial account usage with the first student spending recommendations; and
providing one or more second student spending recommendations based at least in part on the student role, the compared student financial account usage with the first student spending recommendations, and the purchase event, the one or more second student spending recommendations categorized according to a respective category of the student financial account usage.

\* \* \* \* \*